Figure 1:
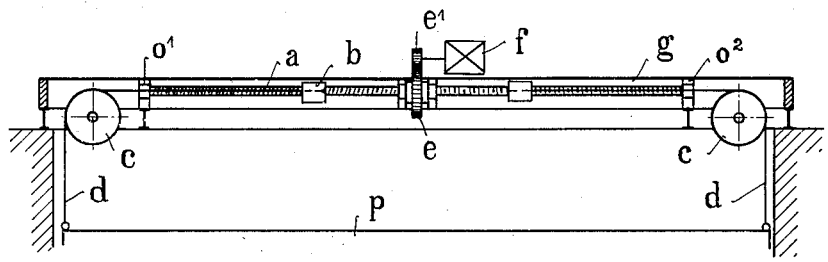

June 16, 1925.

G. LÖDEL 1,542,461

LIFTING DEVICE FOR MOVABLE WEIRS AND THE LIKE

Filed April 11, 1922     2 Sheets-Sheet 1

Witnesses:

Inventor

June 16, 1925.                                                                 1,542,461
G. LÖDEL
LIFTING DEVICE FOR MOVABLE WEIRS AND THE LIKE
Filed April 11, 1922      2 Sheets-Sheet 2

Witnesses:                                                              Inventor Patented June 16, 1925.

1,542,461

UNITED STATES PATENT OFFICE.

GEORG LÖDEL, OF GEORGENSGMUND, GERMANY.

LIFTING DEVICE FOR MOVABLE WEIRS AND THE LIKE.

Application filed April 11, 1922. Serial No. 551,746.

*To all whom it may concern:*

Be it known that I, GEORG LÖDEL, a citizen of Bavaria, Germany, and residing at Georgensgmund, Bavaria, Germany, have invented certain new and useful Improvements in Lifting Devices for Movable Weirs and the like, of which the following is a specification.

This invention relates to improvements in the construction of driving gears for lifting movable weirs and closing devices, such as lock-gates, weir gates, roller weirs, segment-shaped weirs, and similar structures. Hitherto, self-locking wheel gears have generally been employed for operating structures of the kind in question, their lifting elements viz. sprocket chains, racks, ropes, and the like, co-operating with chain-wheels, cogwheel-gears, drums, and the like. Where a heavy load is to be lifted, a construction of the kind in question includes a plurality of cooperating worm gears and large intermediate cog-wheels, which require much space and necessitates the use of a large equipment including much material. Also, the weight of the sprocket chains used as flexible lifting means, is very great, especially where long chains must be used, and the cost of such a structure is therefore very considerable. Wire-ropes weigh less, it is true, but the drum with which they co-operate must have a great diameter and the driving gear must be adequately large so that the total weight of such a plant practically equals that of a chain winding gear including the lifting chains of the same. In certain cases, for instance where the lifting height is comparatively small, lifting gears with vertical spindles may advantageously be used, but if the lifting height is comparatively great or if the impression of the landscape made upon a visitor might be impaired by the long spindles or their protective tubes, that form of construction cannot be employed. This is true also in cases where the lifting power acts in an oblique direction, as, for instance, with roller-weirs, segment-shaped closing devices, and similar structures.
My invention consists in a novel combination and arrangement of the parts of a driving-gear whereby the before-mentioned drawbacks are obviated and, as compared with the usual chain- and rope-drum lifting-gears, not only the construction is greatly simplified, but also much less material is required. The gist of the invention consists in the use of the well-known screw-spindles, in connection with a pliable drawing or lifting member which forms a link between the spindles and the closing means to be lifted, viz. the gate, sluice, roller, or the like, and which member is led over guide pulleys. As a result the driving gear, that is to say, the lifting gear, may be located at any desired place and in any desired position relatively to the member to be lifted. The advantages obtained by this arrangement are very great. First of all, they consist in the possibility of separating from each other the lifting gear and the part to be lifted, so that said gear may be located at the most convenient place. Cumbersome additional structures, such as iron structures, brick work, and the like, can, in most cases, be dispensed with. The lifting gear can be made easily accessible and the vicinity of the closing member, i. e. the sluice, roller, or the like, can be kept free from disturbing transmission elements. Furthermore, it is possible to operate more than one closing member by one driving gear, and this in a much simpler manner than with the other, well-known lifting devices, the pliable intermediate members, i. e. the chains or ropes which pass over the guide-pulleys, being suitably connected with each other.

Figure 2:
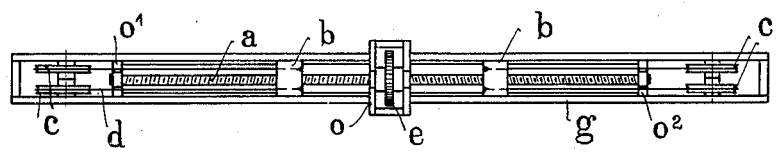
Figure 3:
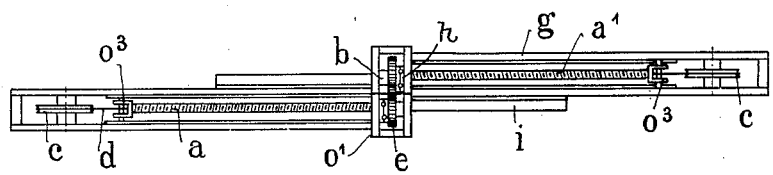
Figure 4:
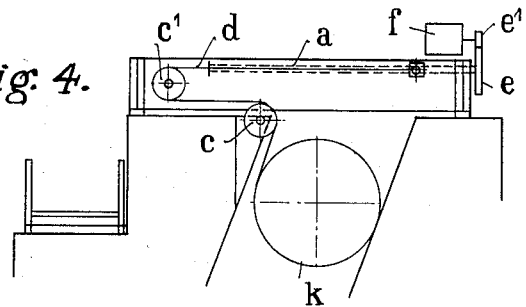
Figure 5:
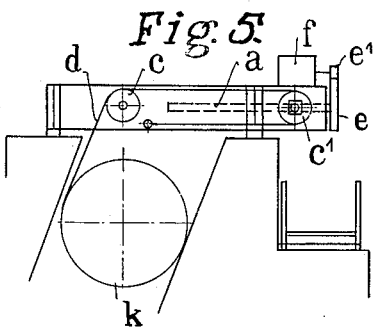
Figure 6:
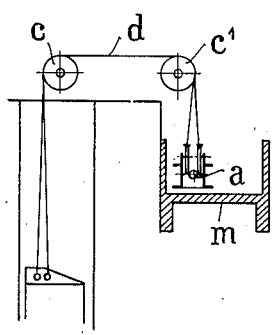
Figure 7:
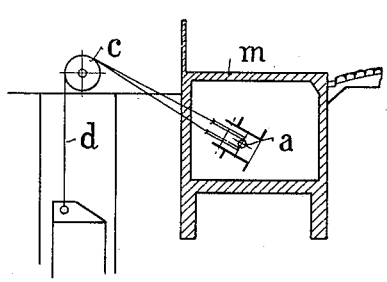
Figure 8:
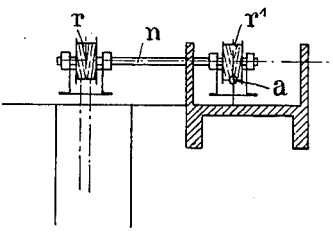
Figure 9:
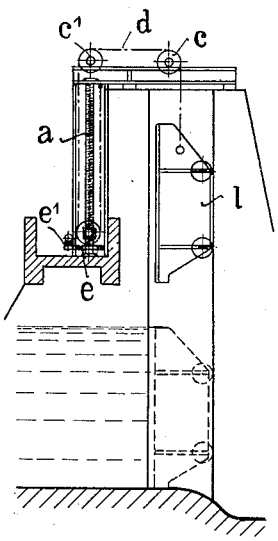

In order to give a clear understanding of my invention, I refer to the accompanying drawing, in which various embodiments are illustrated by way of example, and in which similar letters of reference denote similar parts throughout the several figures, and in which Figure 1 is a vertical section through the top of a sluice, the gate being somewhat lifted, and the spindle-carrying horizontal top-frame being shown in longitudinal section. Figure 2 is a plan of the said frame with its associate parts. Figure 3 is an illustration similar to Figure 2 showing a modification. Figure 4 is a diagrammatic view of the top of a roller weir, the roller being raised and shown in front elevation and the winding gear in side elevation. Figure 5 is an illustration similar to Figure 4 showing a modification. Figure 6 is a diagrammatic view of the upper portion of a sluice having a vertically movable gate, as shown in Fig. 1, the winding gear proper (its mechanical portion) being shown in end view. Figure 7 is an illustration similar to Figure 6 showing another modification Figure 8 shows yet another modification. Figure 9 is also an illustration similar to Figure 6 showing an embodiment having vertical screw-spindles instead of horizontal ones.

In Figures 1 and 2, $a$ is a screw-spindle having for one half of its length a right-hand thread and for the other half a left-hand thread. It is supported at $o^1$ $o^2$ in an oblong frame $g$ which serves also as a guide for two nuts $b$, of which the one co-operates with the righthand thread and the other with the lefthand thread of the spindle. There is also an intermediate spindle-bearing $o$ which encloses a cogwheel $e$ meshing with a pinion $e^1$ adapted to be rotated by an electromotor $f$.

The frame $g$ serves also as bearing for two pairs of rope-pulleys $c$ forming supports and guides for ropes $d$, each of which is connected at its upper end with a nut $b$ and at its lower end with a sluice gate $p$.

The parts enclosed in and carried by the frame $g$ may be covered with sheet-metal plates protecting said parts from being soiled or damaged.

The motor $f$ drives the gearing $e^1$ $e$; the cog-wheel $e$ rotates the spindle $a$ whereby the nuts $b$ are moved along the spindle in one or the other direction, according to the direction of rotation of the armature of the motor. Accordingly, the gate $p$ is either raised or lowered.

Instead of making use of a single spindle having two different threads, there may be two co-axial spindles corresponding in their total length to the length of the spindle $a$, and in that case there are, preferably, two cog-wheels $e$ which are, preferably, constructed so as to form also a kind of coupling for the two spindles, which coupling serves to balance the tensile forces or stresses arising in the spindles, as well as obviates the employment of special thrust bearings at the outer spindle ends.

In the case of moderately long spindles, these are supported in their middle and at their ends, as in Figures 1 and 2, but if a spindle is comparatively long or perhaps, extraordinarily long, it is equipped either with long, displaceable bearings which are arranged at a certain distance from the nuts, but connected with and displaced by them upon the guide-frame $g$, or with bearing-saddles over which slit nuts glide.

Figure 3 shows a construction in which there are two parallel screw-spindles $a$, $a^1$, but contrary to Figures 1 and 2 the spindles are not rotated, but the nuts $b$ which are connected with the cog-wheels $e$ and enclosed with them in the small frame $g$ are rotated. To take up the one-sidedly acting tensile forces or stresses, axial thrust bearings $h$, for instance ball-bearings, are arranged in the frame $e^1$ opposite to the associate nut, or in front of the associate spindle. These latter are, thus, longitudinally displaced by the turning of the cog-wheels $e$ with the nuts $b$. There is, in this instance, only one rope-pulley $c$ and, consequently, only one rope $d$ at each end of the lifting device, and the ropes are operated by the spindles $a$ in practically the same manner as the ropes of Figures 1 and 2 are operated by the nuts $b$. The end-members $o^3$ connect the threaded spindles with the ropes, and are guided by the frame or frames $g$ whereby rotation of the spindles is prevented. $i$ are supporting rails for the free portions of the spindles when projecting forth beyond the frame $o$ at the side of the associate nut.

While in Figures 1-3 details of two embodiments of lifting devices for the closing member of the weir are illustrated, Figures 4-9 show various ways of connecting the lifting device and the closing member with each other. In Figures 4 and 5 the closing member is a drum, and in Figures 6-9 it is a sluice gate.

In view of the above description of the constructions shown in Figures 1-3, it will be unnecessary to go into details as to the construction of the lifting devices shown in Figures 4-9. Any one skilled in the art will fully understand the latter constructions. I shall therefore only mention, with respect to Figure 4, that one end of the rope $d$ is affixed to the drum $k$ and the other end to the threaded spindle $a$. The rope is guided in this instance by two pulleys $c^1$ and $c$. This is the case also in Figure 5, in which however, the pulley $c^1$ is not stationary but attached to the spindle $a$. The two pulleys and the rope co-operate like a tackle, as will be clear without a further description of details. The spindles $a$ (Figs. 4 and 5) are longitudinally displaced similarly to the manner described with respect to Figure 3.

In Figure 6 the rope guide pulleys are stationary (as in Figure 4) and the threaded spindle $a$ lies at right angles with respect to the position shown in Figs. 4 and 5. The ropes $d$ are affixed at one end to the spindle nut and at the other end to the sluice gate 1. In Figure 7 there is but one rope guide pulley and the spindle $a$ is arranged not upon the attendant's gallery $m$, as in Figure 6, but below it. In Figure 8 there are separate ropes adapted to be wound upon, and off, drums $r$ $r^1$, the drum $r$ carrying the rope for the sluice gate and the drum $r^1$ receiving the rope which is connected to the nut of the threaded spindle $a$. The two drums are secured to a shaft $n$, which transmits the rotary motion from the drum $r^1$ to the drum $r$.

Instead of arranging the threaded spindle horizontally, as in Figures 1 to 8, it may be arranged vertically, for instance in the manner illustrated in Figure 9. The rope $d$ runs over two guide pulleys $c$ $c^1$, as in Figture 6; the vertical spindle *a* is rotated and the nut displaced along it, as in Figures 1 and 2, the gear-wheels *e e¹* being arranged, however, not in the middle of the spindle, but at one end thereof.

It is obvious that the inventive idea disclosed herein is capable of a variety of other embodiments, all based on the same principle. The screw-spindle, instead of being horizontally disposed, as in Figures 1–8, or vertically, as in Figure 9, may be arranged also in an oblique position, and instead of two spindles being arranged side by side, as in Figure 3, they may be arranged one above the other, and instead of letting the two spindles act upon a single closing member, they may act upon the parts of a divided closing member, or upon two closing members respectively. The two spindles may have different inclinations for the purpose of obtaining different speeds of the two closing members while being simultaneously operated.

Because the tensile forces act directly upon the spindles, and the turning moment which the cog-wheels must overcome is considerably smaller as compared with other winding gear constructions, a very great saving in material, space, time of installation and cost of manufacture, is obtained, not only as regards the driving gears, but also as regards the protecting buildings required for large plants and the attendants' galleries required in connection with them. There is, furthermore the possibility of making use of wire-ropes, as well as of long-link chains, light and cheap sprocket-chains, and the like, instead of the heavy short-link chains hitherto employed and, in fact, necessary in order to be able to work with chain-wheels of a small diameter; the ropes and the said first-mentioned chains entail a further saving of costs.

I claim as my invention—

1. A lifting gear for weirs and the like, comprising in combination a screw-thread gearing composed of cooperating rotatable and non-rotatable members, means to rotate the rotatable members, a movable closing member, pliable motion-transmitting members connected at one end with the non-rotatable members of said screw-thread gearing, and at the other end with the said closing member, and guiding means for said pliable members.

2. A lifting gear for movable weirs and the like, comprising in combination a screw-thread gearing composed of a horizontal screw-spindle and a nut in engagement therewith, one of the said parts being rotary but immovable in axial direction, the other part being movable only in axial direction, a motor, means for transmitting its rotation to the rotary part of the said screw-thread gearing, a vertically movable closing member, ropes connected at one end with the axial movable part of the said screw-thread gearing, and at the other end with the said closing member, and guiding means for said rope.

3. A lifting gear for weirs and the like, comprising in combination a screw-thread spindle provided with a right- and left hand thread of substantially equal extent, a nut in engagement with each thread, means supporting said spindle, means for rotating the same, a vertically movable closing member, ropes connecting the said nuts with the said closing member, and guide means for each rope.

4. A lifting gear for weirs and the like, comprising in combination a screw-thread gearing composed of a screw spindle, nuts in engagement therewith, a frame, bearings in said frame for said spindle, a means for rotating the said spindle, a movable closing member, pliable means connecting the said nuts with the said closing member, and guiding means for the said pliable connecting means.

In testimony whereof I affix my signature in presence of two witnesses.

GEORG LÖDEL.

Witnesses:
ALEXANDER DE SOTO,
ALEXEI V. PHILIPPOFF.